US010543799B1

(12) United States Patent
Werner et al.

(10) Patent No.: US 10,543,799 B1
(45) Date of Patent: Jan. 28, 2020

(54) SYSTEM AND METHOD FOR ISOLATING AND ACCESSING POTENTIALLY HAZARDOUS PERSONAL DEVICES

(71) Applicant: International Business Machines Corporation, Armonk, NY (US)

(72) Inventors: John S. Werner, Fishkill, NY (US); Noah Singer, White Plains, NY (US); Arkadiy O. Tsfasman, Wappingers Falls, NY (US); Budy Notohardjono, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/153,629

(22) Filed: Oct. 5, 2018

(51) Int. Cl.
| | |
|---|---|
| *B60R 21/02* | (2006.01) |
| *B60R 7/04* | (2006.01) |
| *B60R 16/03* | (2006.01) |
| *B60R 11/02* | (2006.01) |
| *A62C 3/00* | (2006.01) |
| *G07C 9/00* | (2006.01) |
| *B60R 11/00* | (2006.01) |

(52) U.S. Cl.
CPC .............. *B60R 21/02* (2013.01); *A62C 3/002* (2013.01); *B60R 7/04* (2013.01); *B60R 11/00* (2013.01); *B60R 11/02* (2013.01); *B60R 16/03* (2013.01); *G07C 9/00134* (2013.01); *G07C 9/00912* (2013.01); *B60R 2011/0012* (2013.01)

(58) Field of Classification Search
CPC ........... B60R 21/02; B60R 7/04; A62C 3/002; A62C 2/06; G07C 9/00134; G07C 9/00912
See application file for complete search history.

(56) References Cited

U.S. PATENT DOCUMENTS

| | | |
|---|---|---|
| 5,051,565 A | 9/1991 | Wolfram |
| 6,739,400 B2 | 5/2004 | Lessi et al. |

(Continued)

FOREIGN PATENT DOCUMENTS

EP 2866476 A1 4/2015

OTHER PUBLICATIONS

A. Kieler, "At Least 17 Lithium-Ion Batteries Have Exploded on Planes This Year", Consumerist, Jun. 9, 2017, pp. 1-3.

(Continued)

*Primary Examiner* — Thomas D Alunkal

(57) ABSTRACT

A system for protection from potentially hazardous personal devices includes a passenger interaction console co-located proximate to a passenger seat of a vehicle and usable by a user seated at the passenger seat, an isolation chamber configured to store a potentially hazardous personal device, an access control module configured to confirm that the user is authorized to use the potentially hazardous personal device and enable the user to access the potentially hazardous personal device in response to confirming that the user is authorized to use the potentially hazardous personal device. A corresponding method includes determining a passenger seat location for a user, accessing seat assignment information for the user, confirming that user is assigned to the passenger seat location, and enabling the user to access a potentially hazardous device stored within an isolation chamber corresponding to the passenger seat.

19 Claims, 6 Drawing Sheets

(56) References Cited

U.S. PATENT DOCUMENTS

| | | |
|---|---|---|
| 8,544,670 B2 | 10/2013 | Brilmyer |
| 9,339,671 B1* | 5/2016 | Raj .................... A62C 3/08 |
| 9,641,207 B1* | 5/2017 | Bevers ................ H04B 1/3877 |
| 9,719,797 B2 | 8/2017 | Fino et al. |
| 9,745,064 B2* | 8/2017 | Balasubramanian ........................ B64D 45/0005 |
| 2003/0184957 A1 | 10/2003 | Stahl et al. |
| 2013/0157654 A1* | 6/2013 | Gaine ................. H04B 1/3838 455/426.1 |
| 2013/0290221 A1* | 10/2013 | Jindel .................... G06Q 10/08 705/500 |
| 2014/0209331 A1* | 7/2014 | Burkett ................... A62C 2/06 169/46 |
| 2014/0242910 A1* | 8/2014 | Umlauft ............. H04B 7/18506 455/41.1 |
| 2015/0069068 A1 | 3/2015 | Hariram |
| 2015/0205447 A1 | 7/2015 | Jia et al. |
| 2015/0328486 A1 | 11/2015 | Knijnenburg |
| 2016/0152344 A1* | 6/2016 | Palomares Mora ... B64D 41/00 244/58 |

OTHER PUBLICATIONS

Cellblock, "LIBIK New Innovations in Inflight Fire and Smoke Suppression", https://cellblockfcs.com/libik-dry-fire-suppression-kits-cabin-flight-deck/?gclid=EAIaIQobChMI5fuA5pzr3QIVg_5kCh3-OwrkEAAYASAAEgKD, know about as early as Jul. 2018, pp. 1-4.

List of IBM Patent or Patent Applications Treated as Related.

"Electronic Device Containment System With Contained Device Operation Capability" U.S. Appl. No. 16/032,250.

\* cited by examiner

SYSTEM AND METHOD FOR ISOLATING AND ACCESSING POTENTIALLY HAZARDOUS PERSONAL DEVICES

BACKGROUND

The subject matter disclosed herein relates generally to vehicular safety and specifically to protecting vehicles and passengers from potentially hazardous personal devices.

Personal devices such as cell phones, laptops, tablets, and media players are typically powered by rechargeable batteries with high energy densities. Such devices can (e.g., due to manufacturing defects in the batteries) become unstable and cause a fire. Consequently, such devices can pose a safety risk to vehicles and passengers of vehicles.

SUMMARY OF THE INVENTION

A system for protection from potentially hazardous personal devices used by passengers of a vehicle includes a passenger interaction console co-located proximate to a passenger seat of the vehicle and usable by a user seated at the passenger seat, an isolation chamber configured to store a potentially hazardous personal device, an access control module configured to confirm that the user is authorized to use the potentially hazardous personal device and enable the user to access the potentially hazardous personal device in response to confirming that the user is authorized to use the personal device.

A corresponding method and computer program product for executing the corresponding method are also disclosed herein. In one embodiment, the method includes determining a passenger seat location for a user, accessing seat assignment information for the user, confirming that user is assigned to the passenger seat location, and enabling the user to access a potentially hazardous device stored within an isolation chamber corresponding to the passenger seat location in response to confirming that user is assigned to the passenger seat location.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

One of skill in the art will appreciate that references throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The embodiments disclosed herein recognize that isolating personal devices while providing user access can protect vehicles and passengers from hazards associated with such devices (e.g., fires) and enable passengers to use their personal devices. [Note: Not all battery-powered devices are potentially hazardous. For example, devices equipped with low energy density batteries may not be potentially hazardous.]

Figure 1:
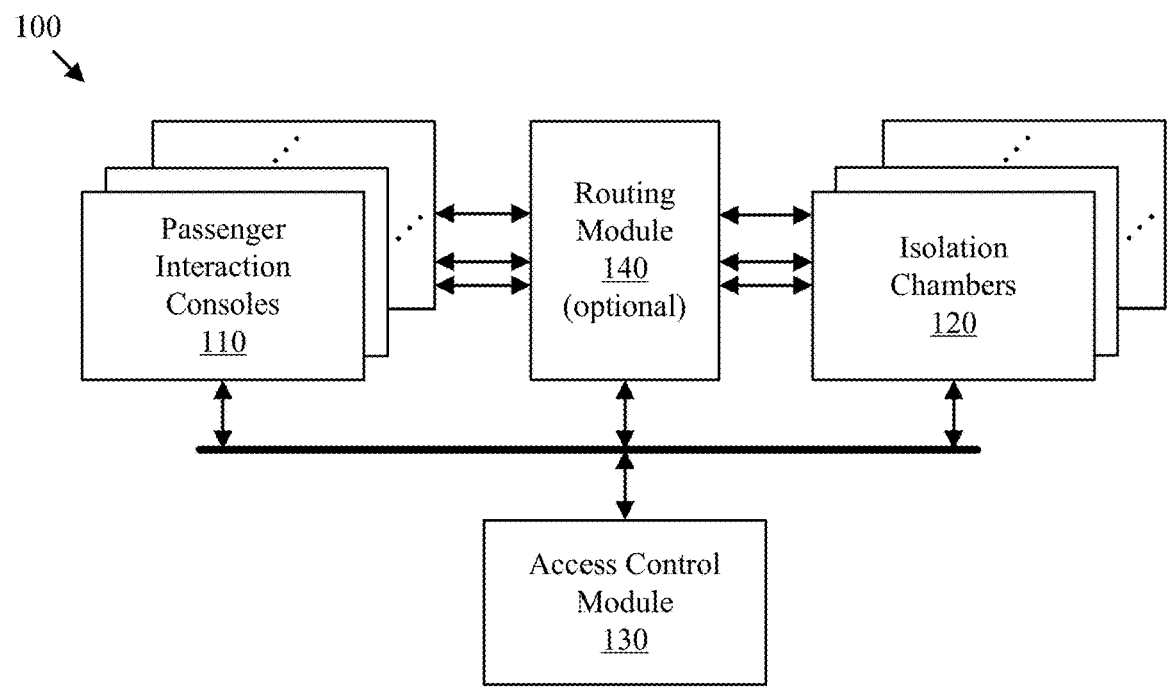
FIG. 1 is a block diagram of one example of hazardous device protection system in accordance with at least one embodiment disclosed herein.

FIG. 1 is a block diagram of one example of a hazardous device protection system 100 in accordance with at least one embodiment disclosed herein. As depicted, the hazardous device protection system 100 includes passenger interaction consoles 110, isolation chambers 120, at least one access control module 130, and an optional routing module 140. The hazardous device protection system 100 enables passengers of vehicles to access their personal devices in a safe manner. Examples of vehicles include aircraft, trains, buses, automobiles, ships, and ferries.

Each passenger interaction console 110 provides a user with an interface for accessing one or more personal devices stored in an isolation chamber 120. Additional functionality such as internet surfing and movie watching may also be provided by each passenger interaction console 110. Each isolation chamber 120 stores at least one personal device for a passenger. The access control module 130 verifies the identity of passengers and enables authenticated passengers to access their personal devices stored in one or more isolation chambers.

The passenger interaction consoles 110 may include user interface components that are common to computers such as displays, pointing devices (e.g., mice, trackballs and touchpads), keyboards, cameras, and I/O ports. The I/O ports may enable communication with various external devices such as USB devices, HDMI displays, audio devices, headphones, storage devices, keyboards, and pointing devices. [Note: The external devices connected to the I/O ports should not be potentially hazardous devices such as devices containing high energy density batteries. Any such devices should be placed within an isolation chamber 120 and, if needed, properly connected to a host device.] The passenger interaction consoles may also provide user interface components common to kiosks such as credit card readers and ticket scanners. The user interface components collectively enable the passenger seated in front of the passenger interaction console to communicate with and control their personal devices stored in the isolation chambers 120 and conduct other activities that may be useful to passengers.

The isolation chambers 120 may include charging and/or data ports that enable continued operation of the personal devices stored therein and data transfers between the personal devices and the interaction consoles 110. One of skill in the art will appreciate that data transfers could be conducted using a wide variety of network protocols including data packet protocols such as TCP, UDP, HTTP, and USB and media streaming protocols such as RTP, RTSP, WebRTC, RTMP, HLS, and MMS. In some embodiments, the isolation chambers 120 also include one or more sensors and/or mitigation devices (see FIG. 2 and the associated description).

The access control module 130 may be a software module that executes on one or more processors. For example, the processors may be associated with a shared access server (see FIG. 4B and the associated description) and/or the interaction console 110. The access control module 130 may determine if the user stationed at a passenger interaction console is able to access one or more personal devices stored in one or more isolation chambers 120. See FIG. 3A and the associated description for one example of an access control method 300 that may be conducted by the access control module 130.

The routing module 140 connects passenger interaction consoles 110 with isolation chambers 120. The routing module 140 may include or control a connection switch (not shown). The connection switch may be a hardware or a software switch. In some embodiments, each passenger interaction console 110 is hardwired to a specific isolation chamber 120. In those embodiments, the routing module 140 and any associated connection switches are not needed.

Figure 2:
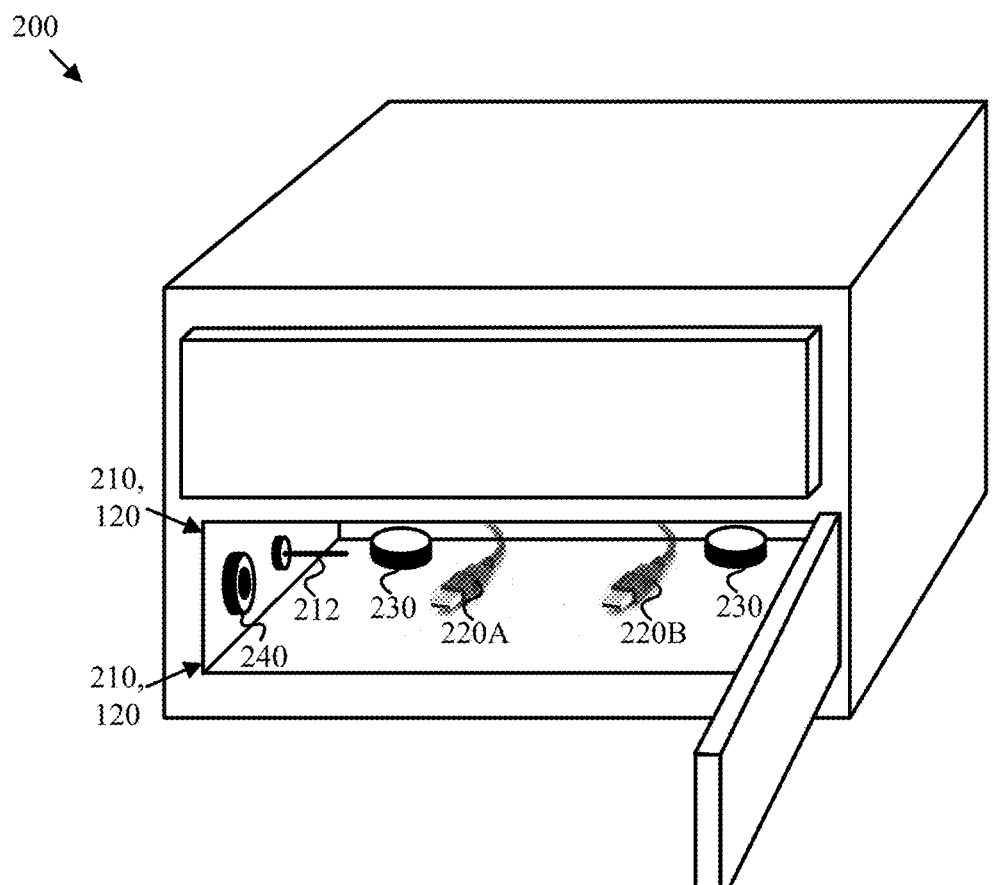
FIG. 2 is a perspective view drawing of one example of a hazard containment locker in accordance with at least one embodiment disclosed herein.

FIG. 2 is a perspective view drawing of one example of a hazard containment locker 200 in accordance with at least one embodiment disclosed herein. As depicted, the hazard containment locker 200 includes isolation chambers 210, ports 220, sensors 230, and one or more mitigation devices 240. The hazard containment locker 200 may physically restrict hazardous events that could occur with personal devices stored therein and prevent damage to a vehicle and the passengers of the vehicle.

The isolation chambers 210 isolate the personal devices stored therein from the general vehicular environment and thereby protect the general vehicular environment from hazardous events associated with the personal devices (not shown) stored within the isolation chambers. The isolation chambers 210 may comprise fire resistance materials (e.g., one or more intumescent materials) and have theft prevention features such an electronically controlled lock (not shown).

The depicted ports 220 include a single power/charging port 220A and a single data port 220B. However, other configurations are possible. The power/charging port 220A provides power to a personal device (not shown) connected thereto. Similarly, the data port 220B enables data communication between a passenger interaction console and a personal device (not shown) connected thereto. In some embodiments, each port 220 is both a power/charging port 220A and a data port 220B and provides both power and data connectivity to a personal device. Additional ports 220 may also be provided within the isolation chambers 210 allowing for connection to multiple different user devices with different power and/or data ports (e.g., HDMI, USB-C, lightning connector, etc.)

The sensors 230 enable detection of hazardous events such as temperature increases, increased thermal emissions, and fires. Examples of such sensors include heat sensors, cameras, infrared sensors, voltage monitors, and thermocouples. The mitigation devices 240 enable mitigation of hazardous events. Examples of mitigation devices include coolers, fire extinguishers, and fire suppression devices including gas cartridges. One of skill in the art will appreciate that the sensors 230 and mitigation devices 240 enable detection and prevention and/or mitigation of hazardous events associated with the personal devices stored within the isolation chambers.

In some embodiments, the sensors 230 are omitted from the isolation chambers 210 resulting in passive hazard mitigation. For example, the isolation chambers 210 may be lined, or otherwise provided, with an intumescent material whose activation temperature is selected to correspond to (pre-combustion) thermal runaway of most potentially hazardous devices. Consequently, hazard mitigation may be achieved without active control.

In some embodiments, the isolation chambers provide electromagnetic isolation and protect the vehicle and associated electronic control systems from unwanted electromagnetic interference from the personal devices (not shown) stored within the isolation chambers. The depicted isolation chamber 210 includes a chamber antenna 212 that facilitates wireless (e.g., Bluetooth and/or WIFI) communication with external devices. For example, the chamber antenna 212 may be electrically connected (e.g., hardwired) to a passenger interaction console and facilitate wireless communication between the passenger interaction console and personal devices stored within the isolation chamber.

Figure 3A:
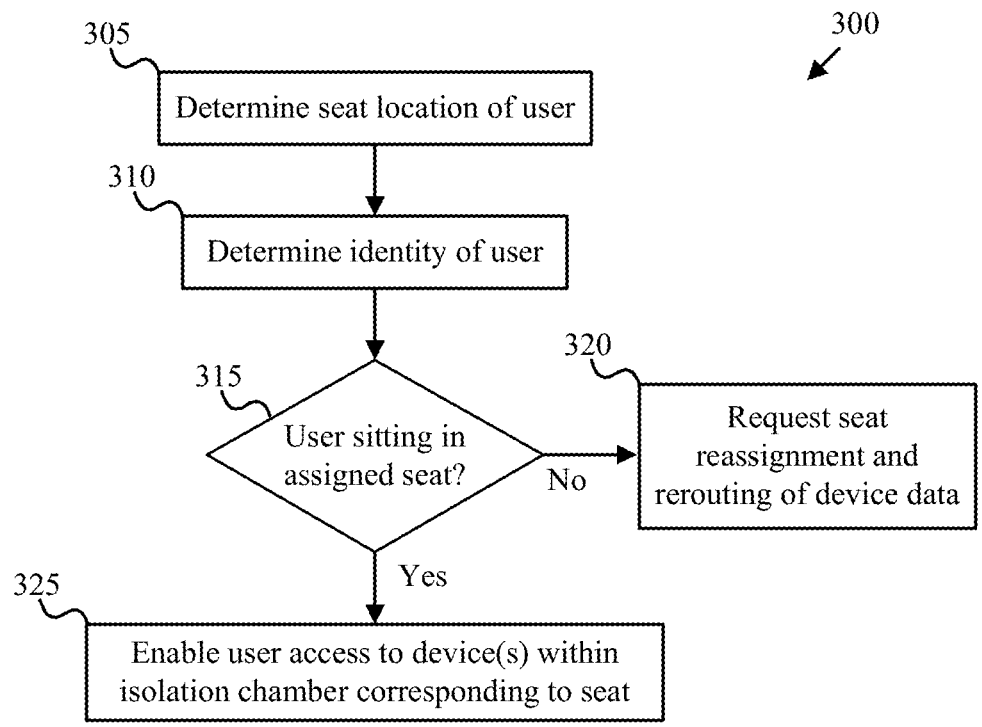
FIG. 3A is a flowchart of one example of an access control method in accordance with at least one embodiment disclosed herein.

FIG. 3A is a flowchart of one example of an access control method 300 in accordance with at least one embodiment disclosed herein. As depicted, the access control method 300 includes determining (305) a seat location of a user, determining (310) an identity of the user, determining (315) whether the user is sitting in their assigned seat, requesting (320) seat reassignment and rerouting of device data if the user is not sitting in their assigned seat, and enabling (325) user access to the devices within an isolation chamber if the user is sitting in their assigned seat. The access control method 300 ensures that isolated personal devices are only accessed by authorized users.

Determining (305) a seat location of a user may include determining the passenger interaction console from which user communication is received and looking up the seat location that corresponds to the passenger interaction console. For example, a unique identifier, such as a MAC address or IP address, may be received or retrieved from the passenger interaction console and the seat location corresponding to the unique identifier may be retrieved from a seat location table. A seat location may alternatively be determined by linking the boarding pass and/or ticket purchased by the user to devices that they intend to bring and used on the vehicle. The linking may be performed by recognizing the device MAC address used to purchase the boarding pass/ticket or by scanning or taking a picture of the boarding pass/ticket with a device that the user intends to bring and use on the vehicle.

Determining (310) an identity of the user may include receiving identification information from the user such as a credit card number and/or a flight confirmation number. For example, the user may be asked to swipe a credit card using a credit card reader on the passenger interaction console. Identity may alternatively be determined using biometrics at the interaction console such as a fingerprint scanner, facial scanner using a camera, voice comparison, etc. The data to compare the biometric scan to may be stored on the device in the isolation chamber that is routed to the users current seat location.

Determining (315) whether the user is sitting in their assigned seat may include checking a flight manifest, or the like, to determine if the identified user was assigned the identified seat. In some embodiments, the user is required to present their boarding pass to a scanner or camera of the passenger interaction console. If the user is not sitting in their assigned seat, the depicted method continues by requesting (320) seat reassignment and rerouting of device data. If the user is sitting in their assigned seat, the depicted method advances by enabling (325) user access to the devices within the isolation chamber.

Requesting (320) seat reassignment and rerouting of device data may include electronically contacting a steward or administrator to authorize the change in seating. Alternatively, the method may use a biometric scan or login information to iterate through devices within the isolation chambers 210 that are not currently in use by other passengers until a match is found to determine proper device routing. Upon authorization, the method may restart and subsequently proceed to the enabling operation 325. Enabling (325) user access to the devices within an isolation chamber may include connecting the passenger interaction console to the devices within the isolation chamber and executing the isolated device access method 360 shown in FIG. 3C.

Figure 3B:
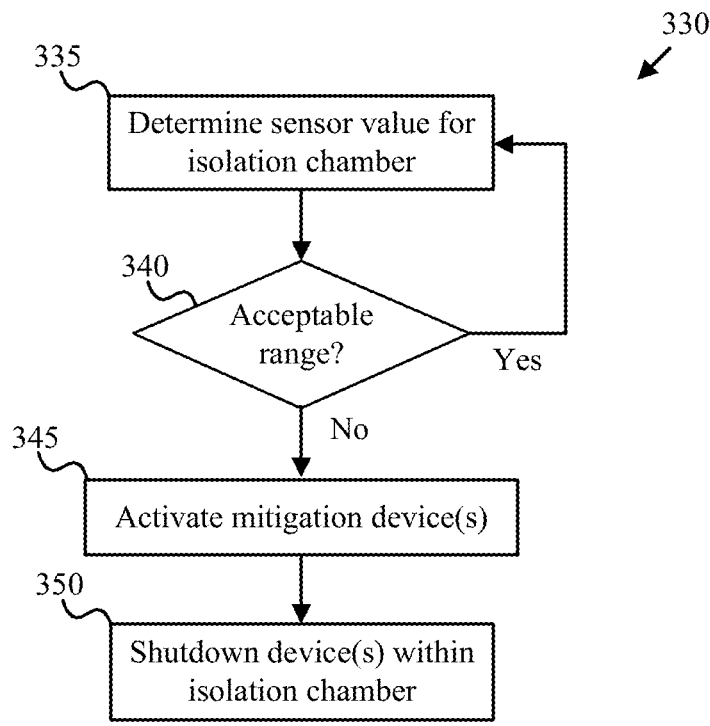
FIG. 3B is a flowchart of one example of a hazard mitigation method in accordance with at least one embodiment disclosed herein.

FIG. 3B is a flowchart of one example of hazard mitigation method 330 in accordance with at least one embodiment disclosed herein. As depicted, the hazard mitigation method 330 includes determining (335) a sensor value for the isolation chamber, determining (340) whether the sensor value is within an acceptable range, activating (345) one or more mitigation devices, and shutting down (350) the devices within the isolation chamber. The hazard mitigation method 330 may reduce the effect of a hazardous event on the vehicular environment and on isolated personal devices themselves. Although the depicted method is for a single sensor, the hazard mitigation method 300 may be adapted by those of skill in the art for use with multiple sensors.

Determining (335) a sensor value for the isolation chamber may include receiving or retrieving a reading from a particular sensor that indicates the magnitude of a parameter sensed by the sensor. For example, a reading of a temperature sensor could indicate the temperature of a particular location in the isolation chamber or the temperature of a location on the surface of a personal device. In another example, a reading of voltage and/or current (e.g., associated with a charging port) could indicate abnormal device behavior.

Determining (340) whether the sensor value is within an acceptable range may include checking a sensor range table and reading a minimum acceptable value and/or a maximum acceptable value corresponding to the particular sensor. If the sensor value is within the acceptable range the method loops to the determining operation 335. If the sensor value is not within the acceptable range the method continues by activating (345) one or more mitigation devices. In some embodiments, the acceptable range may be learned and cognitively adapted over time for different devices (e.g., laptop, tablet, mobile phone, etc.) and/or different models of devices (e.g., Apple iPhone X, Samsung Galaxy S9, Lenovo P50, etc.) by storing sensor readings from past trips and whether an incident occurred within the isolation chamber. For example, an airline may have temperature and/or voltage readings from hundreds of different flights in which at least one passenger used a specific model cell phone. The maximum and minimum readings can be adjusted using the data from these prior flights.

Activating (345) one or more mitigation devices may include sending signals or codes to the mitigation devices to activate a mitigation sequence. For example, a gas cartridge mitigation device may be activated by sending a signal to the mitigation device that opens a valve and releases pressurized gas or another substance into the isolation chamber. The pressurized gas or substance may absorb the oxygen that is available within the isolation chamber and thereby prevent or squelch a fire.

Shutting down (350) the devices within the isolation chamber may include sending a power-down message to an app or utility executing on each personal device stored within the isolation chamber and cutting off power to those devices. Shutting down the device(s) can provide protection from hazardous events for the remainder of the trip due to the halted use of the devices internal battery.

Figure 3C:
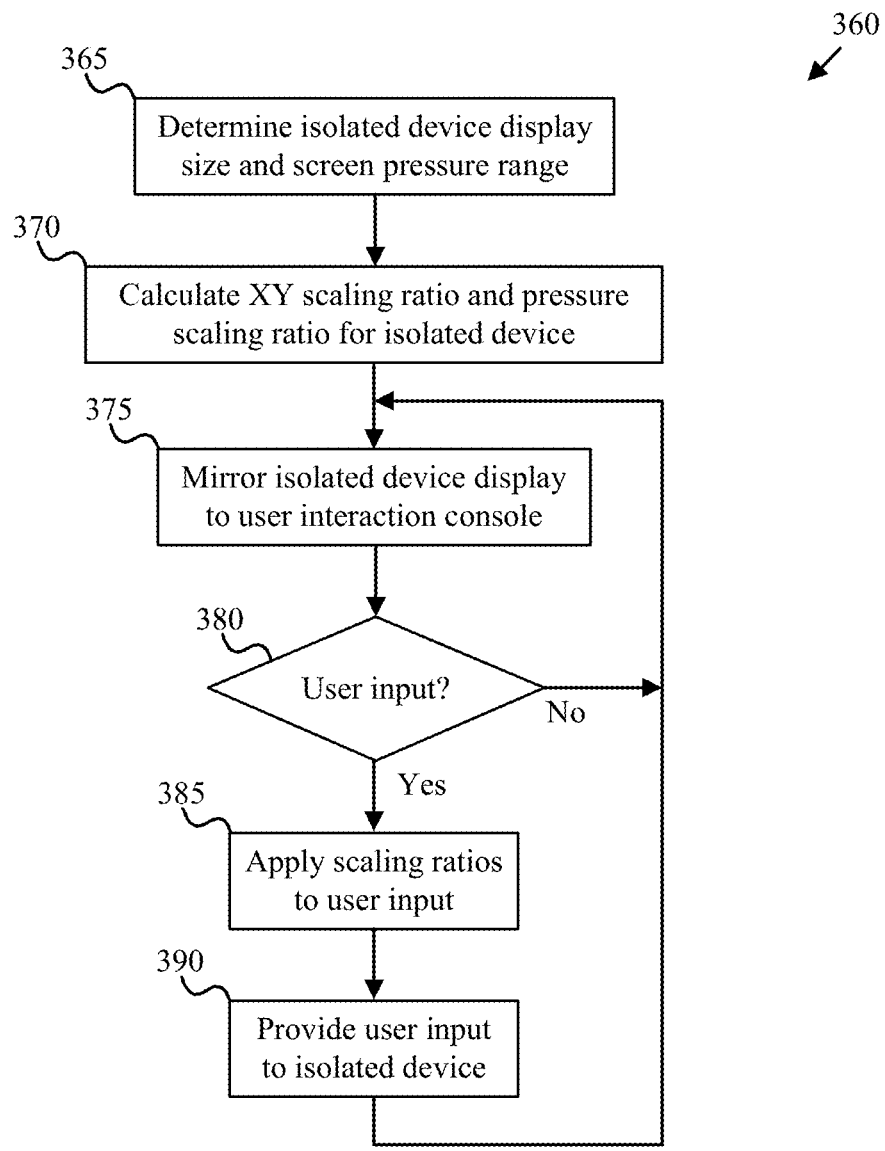
FIG. 3C is a flowchart of one example of an isolated device access method in accordance with at least one embodiment disclosed herein.

FIG. 3C is a flowchart of one example of an isolated device access method 360 in accordance with at least one embodiment disclosed herein. As depicted, the isolated device access method 360 includes determining (365) the display size and screen pressure range, calculating (370) scaling ratios, mirroring (375) the isolated device display to the display of the user interaction console, determining (380) whether user input has occurred, applying (385) the scaling ratios to user input, and providing (390) input to the isolated device. The device access method 360 enables user access to personal devices stored in isolation chambers.

Determining (365) the display size and screen pressure range may include determining the manufacturer and model number of the isolated device and accessing an information table for that particular manufacturer and model number. The information table may indicate the display size (width and height) and screen pressure range for that manufacturer and model number.

Calculating (370) scaling ratios may include dividing the width and height (e.g., in pixels or inches) of the display on the isolate device by the width and height of the display on the passenger interaction console. Calculating (370) scaling ratios may also include dividing the minimum possible and maximum possible pressure reading of a touchscreen or touchpad on the isolated device by the minimum possible and maximum possible pressure readings of a touchscreen or touchpad on the passenger interaction console.

Mirroring (375) the isolated device display to the display of the user interaction console may include sending display rendering commands initiated on the isolated device to device drivers on both the isolated device and the passenger interaction console. In some embodiments, the rendering commands are received by a mirroring utility, or the like, executing on the isolated device and directed to the appropriate device driver on the isolated device. Alternately, the rendering commands may be translated to commands usable by an appropriate device driver on the isolated device.

Determining (380) whether user input has occurred may include checking a semaphore that is set by user input devices drivers on the passenger interaction console when user input has occurred. The device drivers may place user input commands into an input command queue.

Applying (385) the scaling ratios to user input may include reading the user input commands from the input command queue and modifying the commands using the scaling ratios. Providing (390) user input to the isolated device may include providing the modified commands to the isolated device. In some embodiments, the modified commands are processed by the mirroring utility referenced in the mirroring operation 375.

Figure 4A:
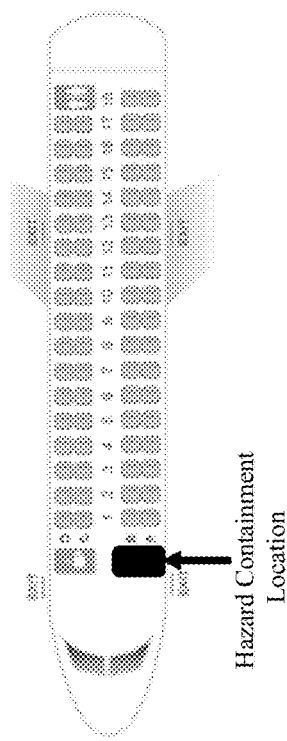
FIG. 4A is a plan diagram and FIG. 4B is a schematic diagram of one example of the hazardous device protection system of FIG. 1 deployed in an aircraft.
Figure 4B:
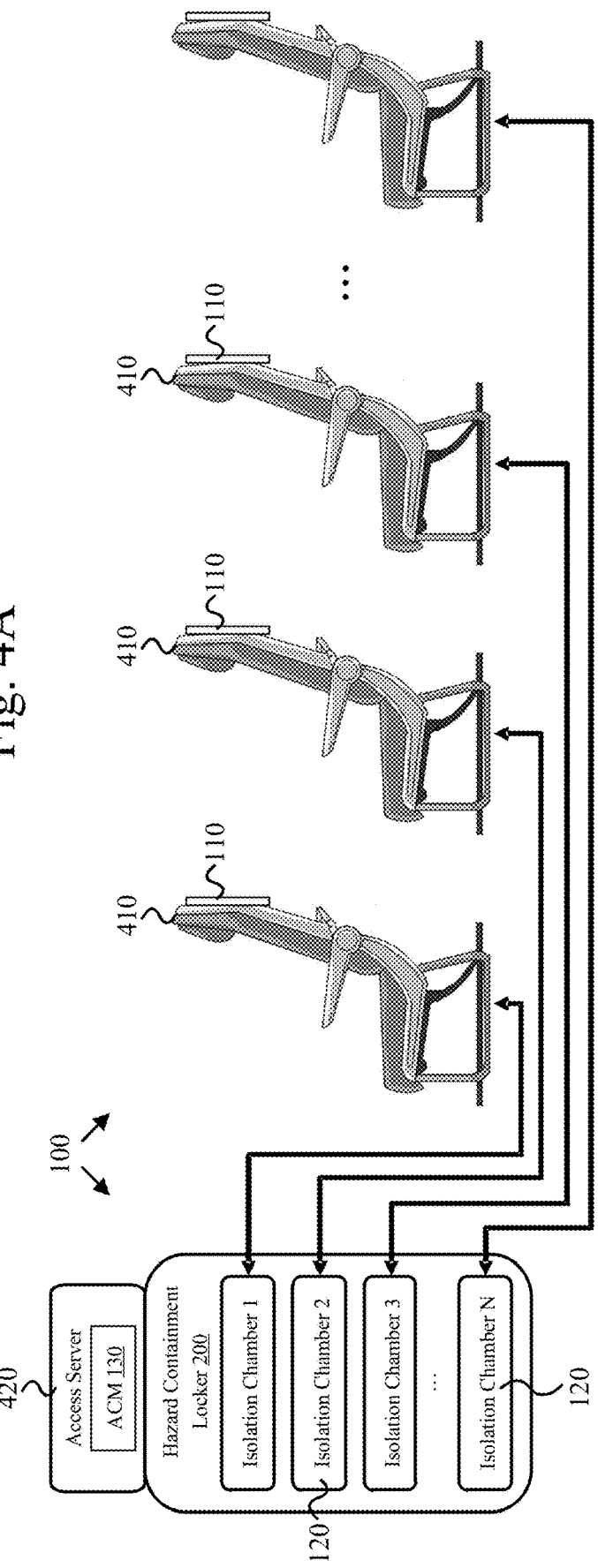

FIG. 4A is a plan diagram and FIG. 4B is a schematic diagram of one example of the hazardous device protection system 100 of FIG. 1 deployed in an aircraft. As depicted, the aircraft deployment of the hazardous device protection system 100 includes a passenger interaction console 110 located on the back of each passenger seat 410, isolation chambers 120 disposed within a hazard containment locker 200, and one or more access control modules 130 executing on one or more processors (not shown) disposed within an access server 420.

In the depicted embodiment, the passenger interaction consoles 110 are hardwired to the access server 420 and charging/data ports (not shown) within the isolation chambers 120. However, the invention is not limited to hardwired embodiments. Potentially hazardous personal devices corresponding to passengers can be stored within the isolation chambers 120 and accessed via the passenger interaction consoles 110. Consequently, passengers of the aircraft can use their potentially hazardous personal devices and the aircraft, passengers, and crew can still be protected from any hazardous events that could occur with those devices.

Figure 5A:
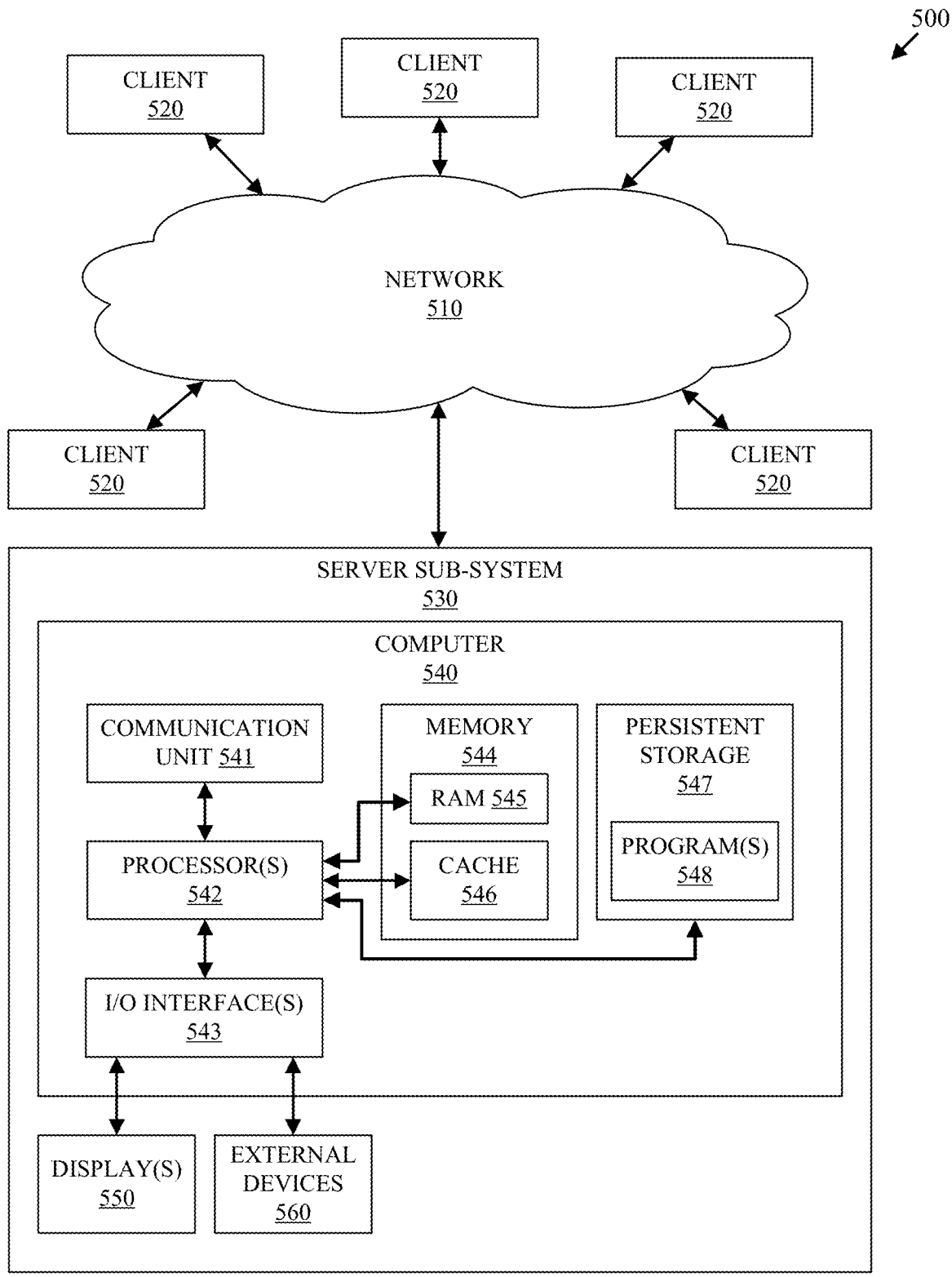
FIG. 5A is a block diagram illustrating various portions of a computing environment in accordance with at least one embodiment disclosed herein.

FIG. 5A is a block diagram illustrating various portions of a computing system 500 in accordance with at least one embodiment disclosed herein. As depicted, computing system 500 includes a communication network 510, one or more client devices 520, and at least one server subsystem 530. The depicted server subsystem 530 includes at least one computer 540 connected to one or more displays 550 and one or more external devices 550. The depicted computer 540 includes a communication unit 541, one or more processors 542, a set of I/O interfaces 543, memory 544, including random access (i.e., main) memory 545 and cache memory 546, and persistent storage 547 that stores one or more programs or executables 548.

Similar to the depicted subsystem 530, the clients 520 may comprise a computer 540. Subsystem 530 and computer 540 are, in many respects, representative of the subsystems and devices that can execute at least a portion of one or more methods disclosed herein. Accordingly, several portions of subsystem 530 and computer 540 will now be discussed in the following paragraphs.

Computer 540 may be a laptop computer, tablet computer, netbook computer, personal computer (PC), desktop computer, personal digital assistant (PDA), smart phone, or any programmable electronic device capable of communicating via network 510. Each executable 548 is a collection of machine readable instructions and/or data that is used to perform at least some of the software functions discussed herein. For example, the methods describe herein may correspond to one or more executables 548.

Computer 540 is capable of communicating with other computing devices, such as the clients 520 and other subsystems 530, via communication network 510. Communication network 510 can be, for example, a local area network (LAN), a wide area network (WAN) such as the Internet, or a combination of the two, and can include wired, wireless, or fiber optic connections. In general, communication network 510 can be any combination of connections and protocols that will support communications between computing devices such as the server subsystem and client subsystems.

Computer 540 is shown as a block diagram with many double arrows. These double arrows (no separate reference numerals) represent a communications fabric, which provides communications between various components of computer 540. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 544 and persistent storage 547 are computer-readable storage media. In general, memory 544 can include any suitable volatile or non-volatile computer-readable storage media. It is further noted that, now and/or in the near future: (i) external device(s) 560 may be able to supply some or all memory for subsystem 530; and/or (ii) devices external to subsystem 530 may be able to provide memory for subsystem 530.

The programs 548 are stored in persistent storage 547 for access and/or execution by one or more of the respective computer processors 542, usually through one or more memories of memory 544. Persistent storage 547: (i) is at least more persistent than a signal in transit; (ii) stores the programs (including its soft logic and/or data) on a tangible medium (such as magnetic or optical domains); and (iii) may be substantially less persistent than permanent storage. Alternatively, data storage may be more persistent and/or permanent than the type of storage provided by persistent storage 547.

Programs 548 may include both machine readable and performable instructions, and/or substantive data (e.g., the type of data stored in a database). In one particular embodiment, persistent storage 547 includes a magnetic hard disk drive. To name some possible variations, persistent storage 547 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 547 may also be removable. For example, a removable hard drive may be used for persistent storage 547. Other examples include optical and magnetic disks, thumb drives, and smart cards that are inserted into a drive for transfer onto another computer-readable storage medium that is also part of persistent storage 547.

Communications unit 541 in the depicted example provides for communications with other data processing systems or devices external to subsystem 520. In these examples, communications unit 541 includes one or more network interface cards. Communications unit 541 may provide communications through the use of either, or both, physical and wireless communications links. Any software modules discussed herein may be downloaded to a persistent storage device (such as persistent storage device 560) through a communications unit (such as communications unit 541).

I/O interface set 543 allows for input and output of data with other devices that may be connected locally in data communication with computer 540. For example, I/O interface set 543 provides a connection to external device set 560. External device set 560 will typically include devices such as a keyboard, keypad, touch screen, and/or some other suitable input device. External device set 560 can also include portable computer-readable storage media such as, for example, thumb drives, portable optical or magnetic disks, and memory cards. Software and data used to practice embodiments of the present invention, for example, programs 548, can be stored on such portable computer-readable storage media. In these embodiments the relevant software may (or may not) be loaded, in whole or in part, onto persistent storage device 560 via I/O interface set 543. I/O interface set 543 also connects in data communication with display device 550. Display device 550 provides a mechanism to display data to a user and may be, for example, a computer monitor or a smart phone display screen.

Figure 5B:
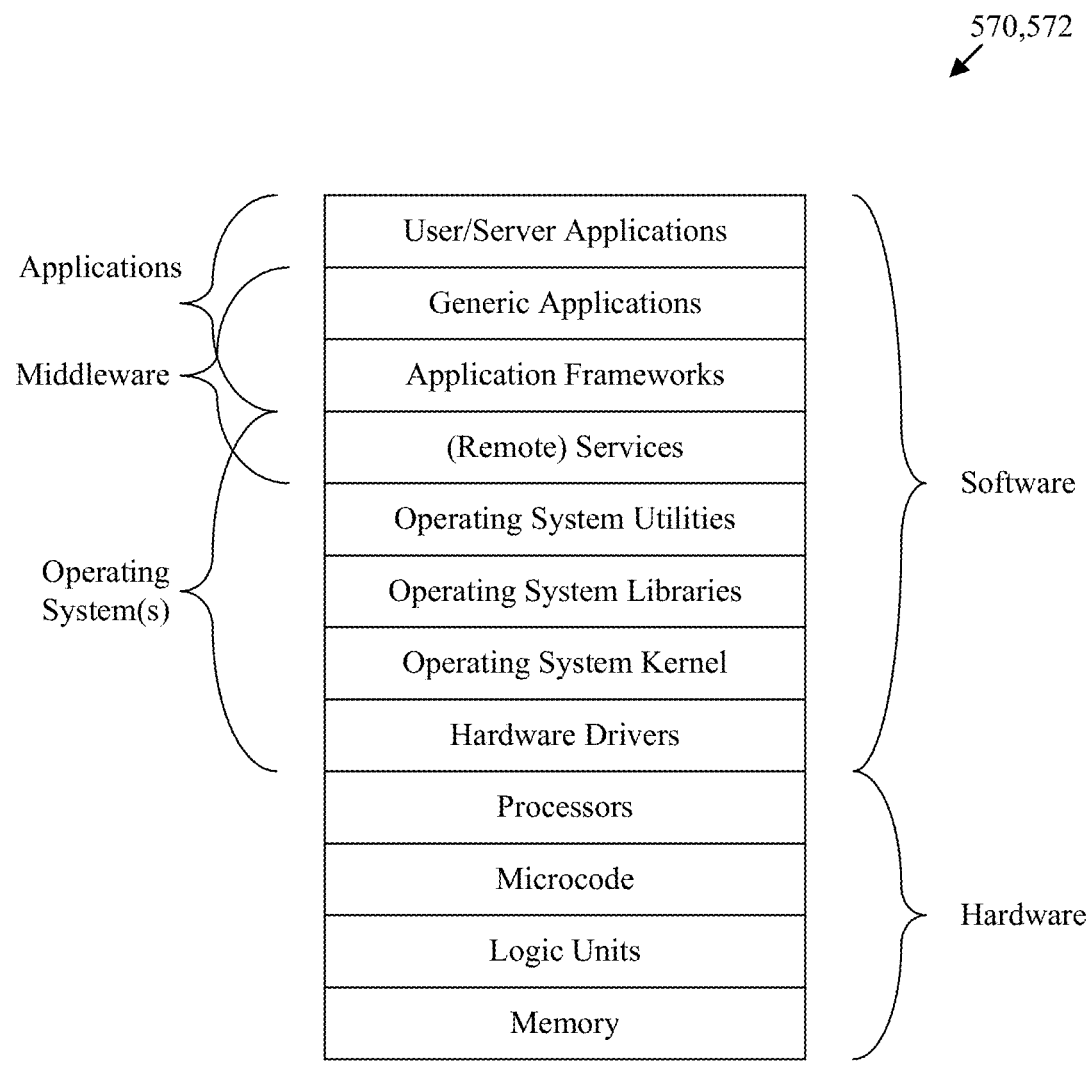
FIG. 5B is a block diagram illustrating one example of a computing stack in accordance with at least one embodiment disclosed herein.

FIG. 5B is a block diagram illustrating one example of a computing stack 570 in accordance with at least one embodiment disclosed herein. As depicted, the computing stack 570 includes a number of computing layers 572 used for conducting computing operations. In the depicted embodiment, the layers include hardware layers and software layers. The various software layers include operating system layers associated with executing one or more operating systems, middleware layers associated with executing middleware that expands and/or improves the functionality of hardware layers, and executing operating system(s). The software layers may also include various application-specific layers. The application-specific layers may include application frameworks that further expand on, and/or improve upon, the functionality of hardware layers and operating system layers.

The memory layer may include volatile memory, non-volatile memory, persistent storage and hardware associated with controlling such memory. The logic units may include CPUs, arithmetic units, graphic processing units, and hardware associated with controlling such units. The microcode layer may include executable instructions for controlling the processing flow associated with moving data between memory and the logic units. The processor layer may include instruction fetch units, instruction decode units, and the like that enable execution of processing instructions and utilization of the underlying hardware layers.

The hardware drivers (also known as the hardware abstraction layer) may include executable code that enables an operating system to access and control storage devices, DMA hardware, I/O buses, peripheral devices, and other hardware associated with a computing environment. The operating system kernel layer may receive I/O requests from higher layers and manage memory and other hardware resources via the hardware drivers. The operating system kernel layer may also provide other functions such as inter-process communication and file management.

Operating system libraries and utilities may expand the functionality provided by the operating system kernel and provide an interface for accessing those functions. Libraries are typically leveraged by higher layers of software by linking library object code into higher level software executables. In contrast, operating system utilities are typically standalone executables that can be invoked via an operating system shell that receives commands from a user and/or a script file. Examples of operating system libraries include file I/O libraries, math libraries, memory management libraries, process control libraries, data access libraries, and the like. Examples of operating system utilities include anti-virus managers, disk formatters, disk defragmenters, file compressors, data or file sorters, data archivers, memory testers, program installers, package managers, network utilities, system monitors, system profilers, and the like.

Services are often provided by a running executable or process that receives local or remote requests from other processes or devices called clients. A computer running a service is often referred to as a server. Examples of servers include database servers, file servers, mail servers, print servers, web servers, game servers, and application servers.

Application frameworks provide functionality that is commonly needed by applications and include system infrastructure frameworks, middleware integration, frameworks, enterprise application frameworks, graphical rendering frameworks, and gaming frameworks. An application framework may support application development for a specific environment or industry. In some cases, application frameworks are available for multiple operating systems and providing a common programming interface to developers across multiple platforms.

Generic applications include applications that are needed by most users. Examples of generic applications include mail applications, calendaring and scheduling applications, and web browsers. Such applications may be automatically included with an operating system.

One of skill in the art will appreciate that an improvement to any of the depicted layers, or similar layers that are not depicted herein, results in an improvement to the computer itself including the computer 540 and/or the client devices 510. One of skill in the art will also appreciate that the depicted layers are given by way of example are not representative of all computing devices. Nevertheless, the concept of improving the computer itself by improving one or more functional layers is essentially universal.

The executables and programs described herein are identified based upon the application or software layer for which they are implemented in a specific embodiment of the present invention. However, it should be appreciated that any particular program nomenclature herein is used merely for convenience, and thus the present invention should not be limited to use solely in any specific identified application or software layer.

The features, advantages, and characteristics of the embodiments described herein may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional units described in this specification may have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

In the preceding description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements. The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for protection from potentially hazardous personal devices used by passengers of a vehicle, the system comprising:
    a passenger interaction console co-located proximate to a passenger seat of the vehicle and usable by a user seated at the passenger seat;
    an isolation chamber configured to store a potentially hazardous personal device;
    an access control module configured to confirm that the user is authorized to use the potentially hazardous personal device;
    the access control module further configured to enable the user to access the potentially hazardous personal device in response to confirming that the user is authorized to use the potentially hazardous personal device;
    the passenger interaction console further configured to determine a display size or a screen pressure range for the potentially hazardous personal device; and
    the passenger interaction console further configured to provide user input to the potentially hazardous personal device based on the display size or screen pressure range.

2. The system of claim 1, wherein the vehicle is selected from the group consisting of an aircraft, a train, a bus, an automobile, a ship, and a ferry.

3. The system of claim 1, wherein the isolation chamber comprises one or more sensors for detecting a potentially hazardous event.

4. The system of claim 3, wherein the one or more sensors comprise at least one of a heat sensor, a camera, an infrared sensor, a voltage monitor, and a thermocouple.

5. The system of claim 1, wherein the potentially hazardous event comprises overheating of the potentially hazardous personal device.

6. The system of claim 1, wherein the isolation chamber comprises a mitigation device for responding to the potentially hazardous event.

7. The system of claim 6, wherein the mitigation device activates fire suppression and/or gas containment.

8. The system of claim 1, wherein the isolation chamber comprises an I/O port that enables the user to access the potentially hazardous personal device via the passenger interaction console.

9. The system of claim 1, wherein the isolation chamber comprises a charging port for the potentially hazardous personal device.

10. The system of claim 9, wherein the charging port is also an I/O port that enables the user to access the potentially hazardous personal device via the passenger interaction console.

11. The system of claim 1, wherein the isolation chamber is separated from the passenger seat and co-located with isolation chambers for other seats.

12. The system of claim 1, wherein the isolation chamber is co-located proximate to the passenger seat.

13. The system of claim 1, wherein the isolation chamber is affixed to the passenger seat or a seat in front of the passenger seat.

14. The system of claim 1, wherein the passenger interaction console comprises one or more of a display, a touchscreen, a pointing device, a keyboard, and an I/O port.

15. The system of claim 14, wherein the I/O port enables communication with one or more of a USB device, and HDMI device, an audio device, headphones, a storage device, a keyboard, and a pointing device.

16. The system of claim 1, wherein the isolation chamber absorbs or blocks electromagnetic radiation from the potentially hazardous personal device.

17. A method for protection from potentially hazardous personal devices used by passengers of a vehicle, the method comprising:
    determining a passenger seat location for a user;
    accessing seat assignment information for the user;
    confirming that user is assigned to the passenger seat location;
    enabling the user to access a potentially hazardous personal device stored within an isolation chamber corresponding to the passenger seat location in response to confirming that user is assigned to the passenger seat location;
    determining a display size or a screen pressure range for the potentially hazardous personal device; and
    providing user input to the potentially hazardous personal device based on the display size or screen pressure range.

18. The method of claim 17, further comprising calculating a scaling ratio for input to the potentially hazardous personal device according to the display size or the screen pressure range.

19. A computer program product for protection from potentially hazardous personal devices used by passengers of a vehicle, the computer program product comprising a computer-readable storage medium having program instructions embodied therewith, wherein the computer-readable storage medium is not a transitory signal per se, the program instructions executable by a processor to cause the processor to conduct a method comprising:
    determining a passenger seat location for a user;
    accessing seat assignment information for the user;
    confirming that user is assigned to the passenger seat location; and
    enabling the user to access a potentially hazardous device stored within an isolation chamber corresponding to the passenger seat location in response to confirming that user is assigned to the passenger seat location;
    determining a display size or a screen pressure range for the potentially hazardous personal device; and
    providing user input to the potentially hazardous personal device based on the display size or screen pressure range.

* * * * *